United States Patent

[11] 3,631,816

[72] Inventor Roy W. Miller
 Highland, Ind.
[21] Appl. No. 887,249
[22] Filed Dec. 22, 1969
[45] Patented Jan. 4, 1972
[73] Assignee Pullman Incorporated
 Chicago, Ill.

[54] HINGED COVERED HOPPER CAR
 17 Claims, 8 Drawing Figs.
[52] U.S. Cl. ................................................. 105/377,
 105/261
[51] Int. Cl. ..................................................... B61d 39/00
[50] Field of Search ............................................. 105/377,
 261; 52/45, 51

[56] References Cited
 UNITED STATES PATENTS
3,457,879 7/1969 Rebenok et al. .............. 105/377
3,467,026 9/1969 Broggie et al. ................ 105/377
3,493,131 2/1970 Allen .......................... 105/377

Primary Examiner—Arthur L. La Point
Assistant Examiner—Richard A. Bertsch
Attorneys—Hilmond O. Vogel and Wayne Morris Russell ABSTRACT: A covered hopper car having a removable and releasably lockable hinged roof pivotally connected to the top of the car body and provided with releasable hinges on each side of the upper car body and each side of the roof for pivotally connecting by pivot pins each side of the car roof with each side of the car body wherein releasable locks are mounted on each of the car body sides and releasably connecting with a respective roof hinge and the car body hinges being tied to the roof hinges by tension rods whereupon tipping of the car toward an upside down position for dumping, results in releasing of one side of the roof from its respective car side while the other roof side remains pivotally connected to the other car body side to permit dumping of the contents through the open top of the car.

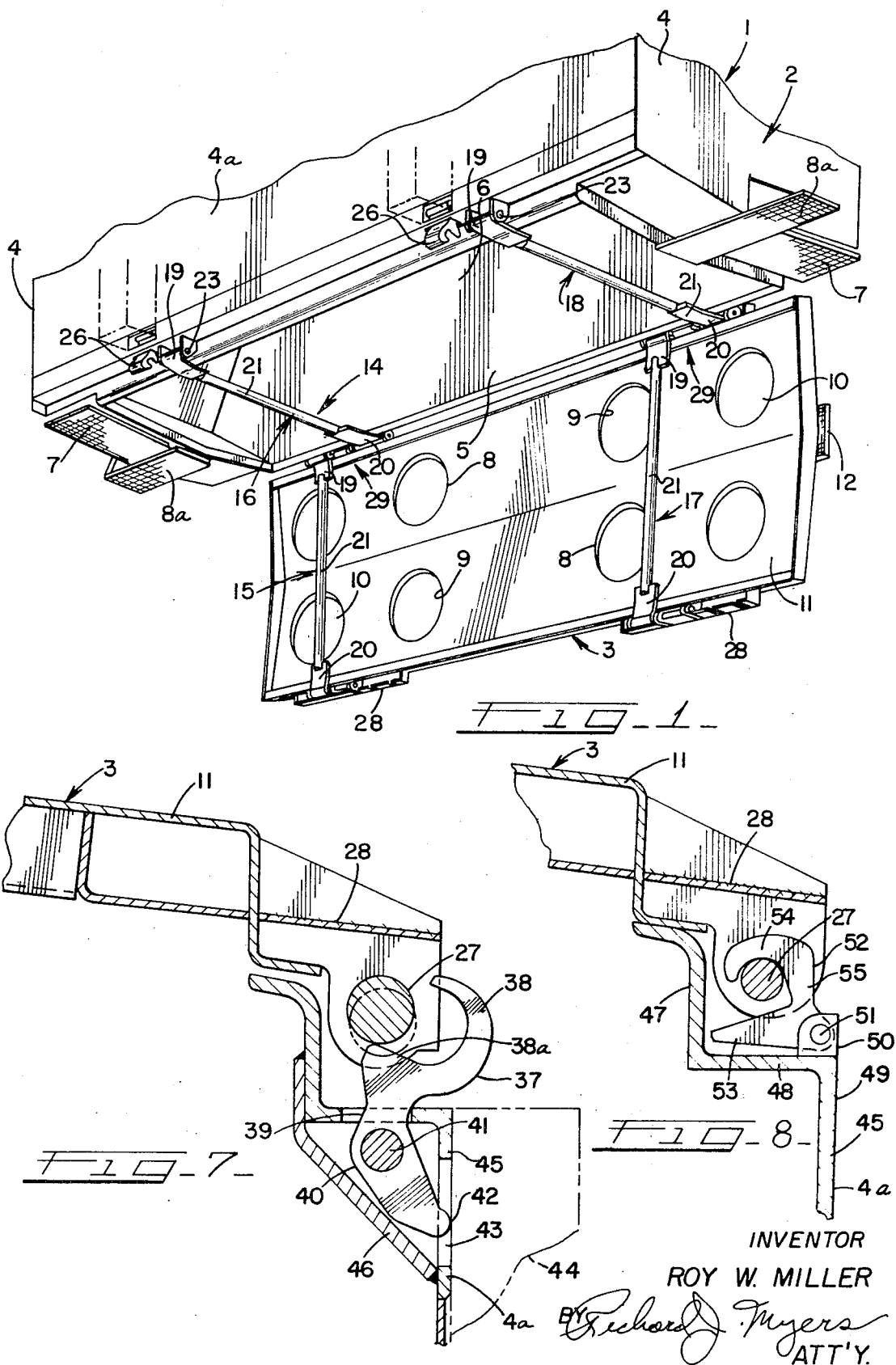

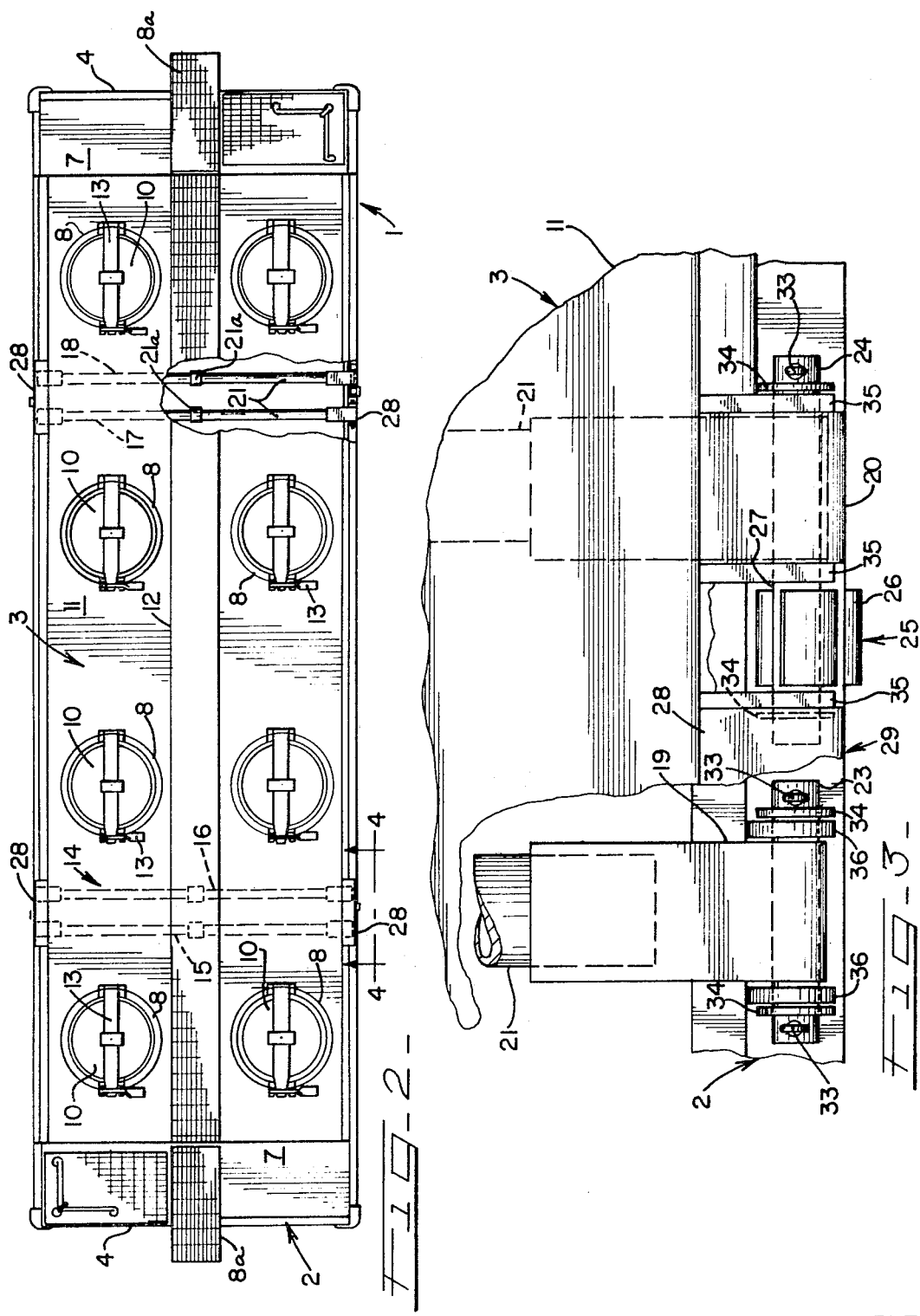

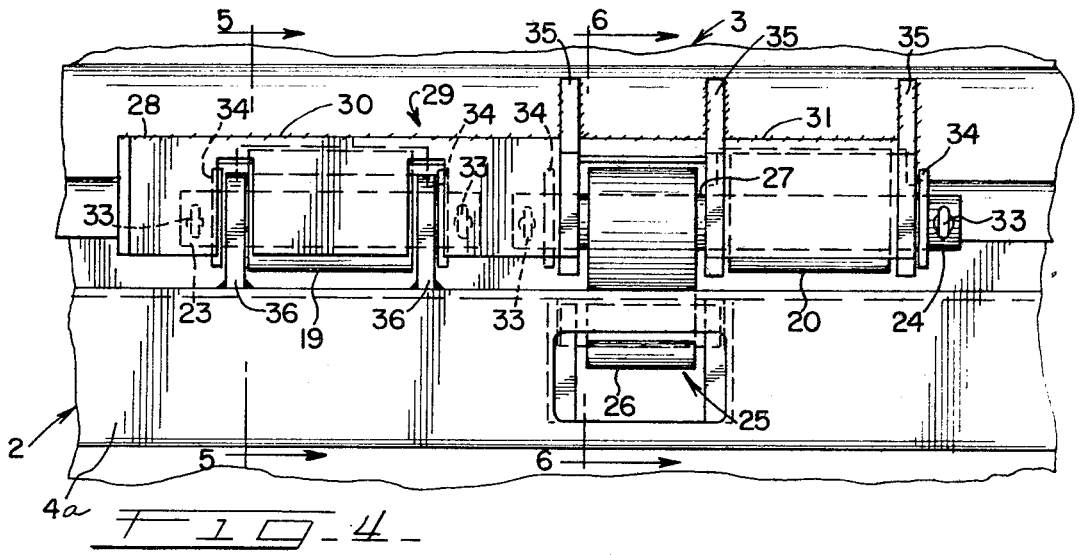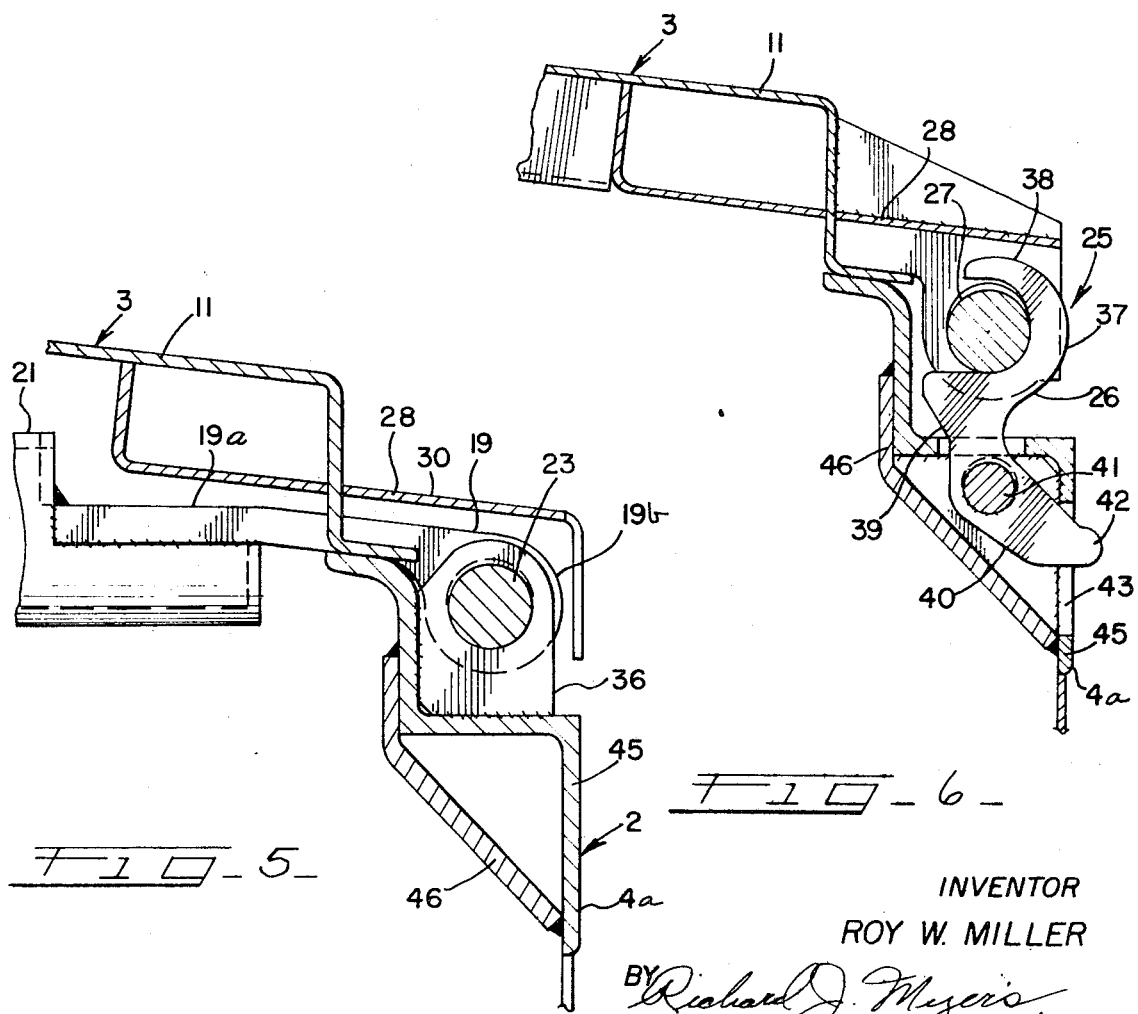
INVENTOR
ROY W. MILLER

HINGED COVERED HOPPER CAR

SUMMARY OF THE INVENTION

This invention in general relates to a covered hopper car provided with removable roofs.

It is therefore a general object of this invention to provide for a covered hopper car having the upper portion of the car body provided with hinged means on each side thereof for coupling with associated hinged means on complementary sides of the car roof and wherein releasable locking means are mounted on the upper portions of the car body sides for retaining one of the two sides of the roof connected to the car while the other side of the roof is allowed to pivot away from the car body when the car is rotated from an upright position to an upside down position permitting dumping of the contents such as wet ore within the car body outwardly therefrom.

It is another object of this invention to provide for a novel hinging and hinge releasing means selectively coupling one of the two sides of the upper part of the hopper car with a respective side of the roof, the hopper car being rotated about its longitudinal axis and swinging the roof down to open the top of the car in order to dump the contents in the hopper portion from the car.

Still another object of this invention is to provide for a novel tension rod arrangement between the hinge mounted on the side plate of one side of the car and the hinge that is mounted on the roof side at the opposite side of the car.

Another object of this invention is to provide for a hinged roof arrangement on the car body of a covered hopper car wherein the roof may swing away from one of two sides of the car when the car is rotated about 180° about its longitudinal axis from an upright position to either side and where there is further provided tension rods connecting the car body hinges with the roof hinges.

Still another object of this invention is to provide for a hopper car having a roof which may be hingedly connected to the body and which one side of the roof may be remained pivotally connected to the car body while the other side swings away therefrom and wherein there is provided for novel hinged releasing means on the car body which may be moved by the rotating structure for rotating the hopper car about its longitudinal axis or in the alternative wherein the lock release means for releasing the hinge arrangements on one side of the hopper is due to the lock release means being subject to gravity.

These and other objects will become more readily apparent from reference to the following description of attached drawings and appended claims.

BRIEF DESCRIPTION OF THE DRAWINGS

FIG. 1 is an inverted view of a portion of a hopper car showing the roof hingedly connected to one side of the hopper body while the other side of the roof is free from its respective side of the hopper body and is hanging in a downward position;

FIG. 2 is a top plane view of the novel covered hopper car;

FIG. 3 is a partial sectional view of the top of the hopper car shown in FIG. 2;

FIG. 4 is a sectional view taken along line 4—4 of FIG. 2;

FIG. 5 is a sectional view taken along line 5—5 of FIG. 4;

FIG. 6 is a sectional view taken along line 6—6 of FIG. 4 of the hopper car hinge locking means in the locked position;

FIG. 7 is a view similar to FIG. 6 but showing the hinge locking means in an unlocked position permitting the hopper roof to be swung away from the hopper body; and FIG. 8 is a modified form of the roof hinge releasing means to that shown in FIG. 7.

DETAILED DESCRIPTION

With reference now to the drawings and in particular with reference to FIG. 1, there is partially shown a hopper car 1 in the inverted position, the hopper car being so placed by a rotary mechanism along the side of the railroad track to permit dumping of the contents within the hopper car through the upper portion of the car by rotation of the pivotal roof from a closed to an open position due to gravity. The hopper car has a car body 2 and a pivotal roof section 3 pivotally connected with the car body which is provided with end walls 4 and sidewalls 4a and an interior 5 having an opening 6 in the top of the car body. The car body end top portions 7 are provided with running board sections 8a and circular hatch means 8 is provided in the roof section 3. Each of the plurality of hatch means shown is provided with an opening 9 and a hatch cover 10 and a hatch tiedown means 13 as seen in FIG. 2. The roof section is provided with a top wall 11 and a roof runner portion 12.

The roof has on each of its longitudinal sides novel hinge means for hinging one side of the roof to one upper side of the car. Consequently, as the roof is rotated with the car body, the side of the roof first subjected to gravity uncouples and the other side of the roof remains pivotally connected to the respective upper sidewall portion of the car body by the novel hinge means 14. The hinge means on each side of the car include a plurality of hinged structures 15, 16, 17 and 18. Each of the hinge structures 15, 16, 17 and 18 includes a hinge member 19 for the car body (see FIG. 3) and a hinge member 20 for the roof opening (see FIG. 3) and a tension of tie rod member 21 (with length adjusting turnbuckle 21a) between the hinge member 19 and the hinge member 20, the tie member 21 connecting a car body hinge member 19 that is on the other side of the roof from the roof hinge member 20 to which it connects. Each car body hinge member and roof hinge member are pivotally connected together by pin means and there is a car hinge tie pivot pin 23 for a car body mounted hinge and there is a roof hinge tie pivot pin 24 for a roof mounted hinge member 20. Latch means 25 are provided for on each side of the car at each set 29 of adjacent hinge member 19 and hinge member 20. The latch means 25 may be seen in FIGS. 3, 4, 6 and 7 and a modified form of the latch means may be seen in FIG. 8.

The latch means 25 includes a latch hook element 26 and a latch or catch pin or bar element 27 as best seen for instance in FIG. 6. There is also provided a housing and support structure 28 for housing and supporting a pair of adjacent roof and car hinge members 19 and 20 and as stated is generally designated as 29 in FIGS. 1, 2 and 3. The housing and support structure 28 includes a housing portion 30 for a respective car hinge member 19 and a respective car pin member 23 and also includes a support portion 31 for a respective roof hinge member 20 and a roof pivot pin 24. As seen in FIG. 3 the latch pin 27 is in general longitudinal axial alignment with the adjacent associated roof hinge pin 24. As also seen in FIGS. 3 and 4 cotter pin 33 and washers 34 and trunnions or fulcrum plates 35 for the roof hinge pin 24 and trunnions or fulcrum plates 36 for the car hinge pin 23 are provided.

The tension member or tie member 21 connects between hinge members 19 and 20 that are spaced on opposite sides of the roof from one another and, as best seen in FIGS. 1 and 2, a latch hook element 26 is mounted on the top of the side plate of the car body adjacent the car body hinge member 19. The hinge member 19 is pivotally connected to the car body by the car body hinge pin 23, the tie member 21 extending from the car body hinge member 19 laterally across the top of the car body to and connecting with the hinge member 20 of the roof which pivotally is connected to roof hinge pin 23 which is adjacent to a car hinge member 19 from which extends the tie or tension member 21 along the open roof (as seen in FIG. 1) to the hinge member 20 on the roof which is pivotally connected to the roof hinge pin 24 which is adjacent the latch pin 27.

As shown in FIG. 1 the latch pin 27 and the latch element 26 are coupled to one another where the roof is attached to the car body and the latch pin and latch member therefore act at the connected side of the roof relative to the car body by means of the hinged structure which includes two car hinges and two roof hinges and their respective hinge pins as tied together by the two tie or tension members 21. The latch pin and latch member serve to keep roof and car body at the connected end together for the first 20° of fall from the vertical position of the roof when the body is in the horizontal position, the car having traveled from an upright position 90° to such body horizontal position. After the body horizontal position is reached the hook element can separate from the hook pin but it cannot until an additional 20° of rotation occurs at which time unlatching of the hook from the pin occurs on the unconnected or unhinged side to allow the free end of the roof to swing downwardly to permit dumping of the contents from the car and once the 20° position beyond the horizontal car body position is reached the latch pin and latch element are no longer required other than they do add a stabilizing effect at the connected end of the car body with the roof.

With reference now to FIG. 6 the detail of the latch means 25 is shown. The hook element 26 comprises an elongated member having a short upper curved arm portion 38 which extends across approximately 80 percent of the diameter of the latch pin 27 and has a vertical shank portion shelf 38a that extends the full extent and beyond the diameter of the latch pin 27 and this arrangement permits the hook portion 37 to free itself from the latch pin when the car body rotates 20° beyond 90° from the upright position as aforesaid. Extending from the vertical shank 39 is a lower diagonally outwardly directed arm portion 40 pivotally connected by pivot pin 41 to the car body side plate 45. The very outer end or bulk portion 42 of the lower arm portion 40 may be engaged by a part of the rotating fixture or clamping frame designated as 44 (see FIG. 7) to insure uncoupling of the latch element 26 from the latch pin 27. As seen in FIGS. 6 and 7 the shank portion 39 of the hook member 36 extends through an aperture 43 in the horizontal wall of the side plate 45 which also has an upper vertical arm which has a curved upper end and a lower outer vertical wall 4a which has the aperture 43 through which the bulb portion 42 is extendable, the shank 39 and the lower arm portion 40 being encased between the side plate 45 and the side plate closure plate 46. The car body hinge 19 is also mounted on the horizontal wall of the side plate 45, as seen in FIG. 5. The hinge 19 has a hook portion 19b around the hinge portion 23 and has a horizontally extending hinge portion 19a connecting with the tension member 21.

A modified form of uncoupling latch means 25 is shown in FIG. 8 wherein a hook 52 is pivotally mounted on a pivot support 50 mounted on the horizontal wall 48 adjacent the upper vertical wall 47 and the depending wall 49 of the side plate 45. A pin 51 is pivotally supported in the pivot support 50. The hook 52 is provided with a lower inwardly directed counterweight part 53 and top short hook portion 54 extending about the diameter of the pin 27 and connected to the counterweight portion 53 by the upright arm 55. By such a modified form the latch member will uncouple from the latch pin without the aid of the rotating fixture or clamping frame 44 because of the counterweight 53 moving the rest of the hook 52 either onto the pin or away from the pin depending on the inclination of the car body and car roof with respect to the horizontal position upon rotation of the car about its longitudinal axis past the horizontal position. If the latch member 52 is less than 90° plus 20° from its upright position, as aforesaid, the counterweight portion 53 will not act but if the rotation is beyond 110° then the counterweight part will move the entire latch member 52 away from the pin 27 to allow movement of the roof away from the car body to permit dumping of the contents from the car body.

Thus it is seen that by such an arrangement the roof may be pivoted or swung away from the hopper car body in either direction of rotation of the car without the roof at any time becoming completely disconnected from the car body and yet the roof may be locked to the car body on both sides when the car is in an upright position.

The design is such that the releasable locks 25 could hold either one side or the other side of the roof to the inverted car body. However, irrespective of the releasable locks 25 on either side of the car, the construction of the car body and roof hinge means and connecting means or tension rods also could permit the roof to hang from either side of the inverted car and have the additional advantage that the support of the roof is taken through the tension rods and in effect taken through the roof structure rather than just at the points of connection of the releasable lock and hinge means. Therefore the entire arrangement is a more structurally sound device with the releasable lock means assuring closed locked coupling of the roof to the car body when the car is in the upright position. The tension rods and the hinges act as one continuous hinge action such that if the tension rods were severed the hinging of the roof could not occur.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A covered hopper car having an open car body portion having a pair of upper side parts, a removable releasably lockable pivotal roof mounted on said side parts, releasably locking and hinging means on each side of the car upper side parts on each side of the car roof comprising:

first hinge means on each upper side part, second hinge means on each roof side and connecting means connecting the first hinge means with the second hinge means, tension connecting means connecting the first hinge means and the second hinge means together and extending generally the width of the roof for suspension of the roof from either side of the car upon rotation of the car, and releasable lock means for lockingly connecting the roof to the upper side parts in the upright position of the car and releasing one roof side from one of the upper side parts for pivotal movement of the other roof side about the other upper side part of the car body upon rotation of the car about a longitudinal axis from the upright position to the inverted dumping position.

2. The invention according to claim 1, and said first car hinge means comprising:

a first car hinge pin mounted on one of said upper side parts, a first car hinge member pivotally mounted on said first car hinge pin, a second car hinge pin mounted on the other upper side part, a second car hinge member pivotally mounted on said second hinge pin.

3. The invention according to claim 1, and said second hinge means comprising:

a first roof hinge pin mounted on one of the sides of the roof, a first roof hinge member pivotally mounted on said first roof hinge pin, a second roof hinge pin mounted on the other side of said roof, a second roof hinge member pivotally mounted on said second roof hinge pin.

4. The invention according to claim 1, and said first car hinge means comprising:

a first car hinge pin mounted on one of said upper side parts, a first car hinge member pivotally mounted on said first car hinge pin, a second car hinge pin mounted on the other upper side part, a second car hinge member pivotally mounted on said second hinge pin, said second hinge means comprising:

a first roof hinge pin mounted on one of the sides of the roof, a first roof hinge member pivotally mounted on said first roof hinge pin, a second roof hinge pin mounted on the other side of said roof, a second roof hinge member pivotally mounted on said second roof hinge pin.

5. The invention according to claim 4, and
said connecting means comprising:
a first tension member connecting said first car hinge member with said second roof hinge member,
a second tension member connecting said second car hinge member with said first roof hinge member.

6. The invention according to claim 4, and
said first car hinge member being adjacent said first roof hinge member and said second car hinge member being adjacent said second roof hinge member.

7. The invention according to claim 4, and
a first housing for enclosing said first car hinge member and said first roof hinge member,
a second housing for enclosing said second car hinge member and said second roof hinge member.

8. The invention according to claim 4, and
said adjacent car body hinge pins and roof hinge pins being in general axial alignment with one another on the side where the roof is attached to the car body.

9. The invention according to claim 3, and
said releasable lock means comprising:
a latch pin mounted on each roof side and in general axial alignment with and adjacent to the associated roof hinge pin,
a latch member mounted on each side of said car body, each latch member in having an upper hook portion receivable about the respective latch pin.

10. The invention according to claim 4, and
said releasable lock means comprising:
a latch pin mounted on each roof side and in general axial alignment with and adjacent to the associated roof hinge pin,
a latch member mounted on each side of said car body, each latch member in having an upper hook portion receivable about the respective latch pin.

11. The invention according to claim 7, and
each of said housings being mounted on the side of the roof.

12. The invention according to claim 9, and
having a lower arm below its pivot engageable by an associated member on the car rotating jig and unlatching of the latch member from the latch pin.

13. The invention according to claim 9, and
having a lower counterweight arm for swinging the latch member away from the latch pin upon sufficient rotation of the car by an associated rotating jig.

14. A covered hopper car having an open car body portion,
a removable releasably lockable pivotal roof mounted on said car body,
car hinge means on each side of the car body roof hinge means on each side of the roof,
tension means connecting the car hinge means and the roof hinge means together and extending generally the width of the roof, and
releasable lock means on each side of the car connecting roof with the car body and selectively releasable on one side of the car and roof upon rotating the car from an upright position with one side of the roof separating from one side of the car body and the other side of the roof pivoting about the other side of the car body.

15. The invention according to claim 14, and
said car hinge means comprising a fore and aft car hinge on each side of the car body,
said roof hinge means comprising a fore and aft roof hinge on each side of the roof,
each roof hinge being adjacent a car hinge,
said tension means including a pair of fore tension rods and a pair of aft tension rods, each tension rod extending generally the width of the roof and car body,
each tension rod at one end being connected with a roof hinge and at the other end with a car hinge whereby the roof may pivot with respect to the car at either side of the car.

16. The invention according to claim 14, and
said releasable lock means comprising a fore and aft lock latches on each side of the car and fore and aft lock pins on each side of the car, each lock latch being cooperative with a latch pin whereby one side of the roof may be selectably locked to the one side of the car body or in the alternative the other side of the roof may be locked to the car body.

17. The invention according to claim 16 wherein
the lock latches are mounted on the car body and the latch pins are mounted on the roof.

* * * * *